Nov. 22, 1938.  W. E. GILMORE  2,137,822
STORAGE AND DELIVERY APPARATUS
Filed Nov. 11, 1936  2 Sheets-Sheet 1
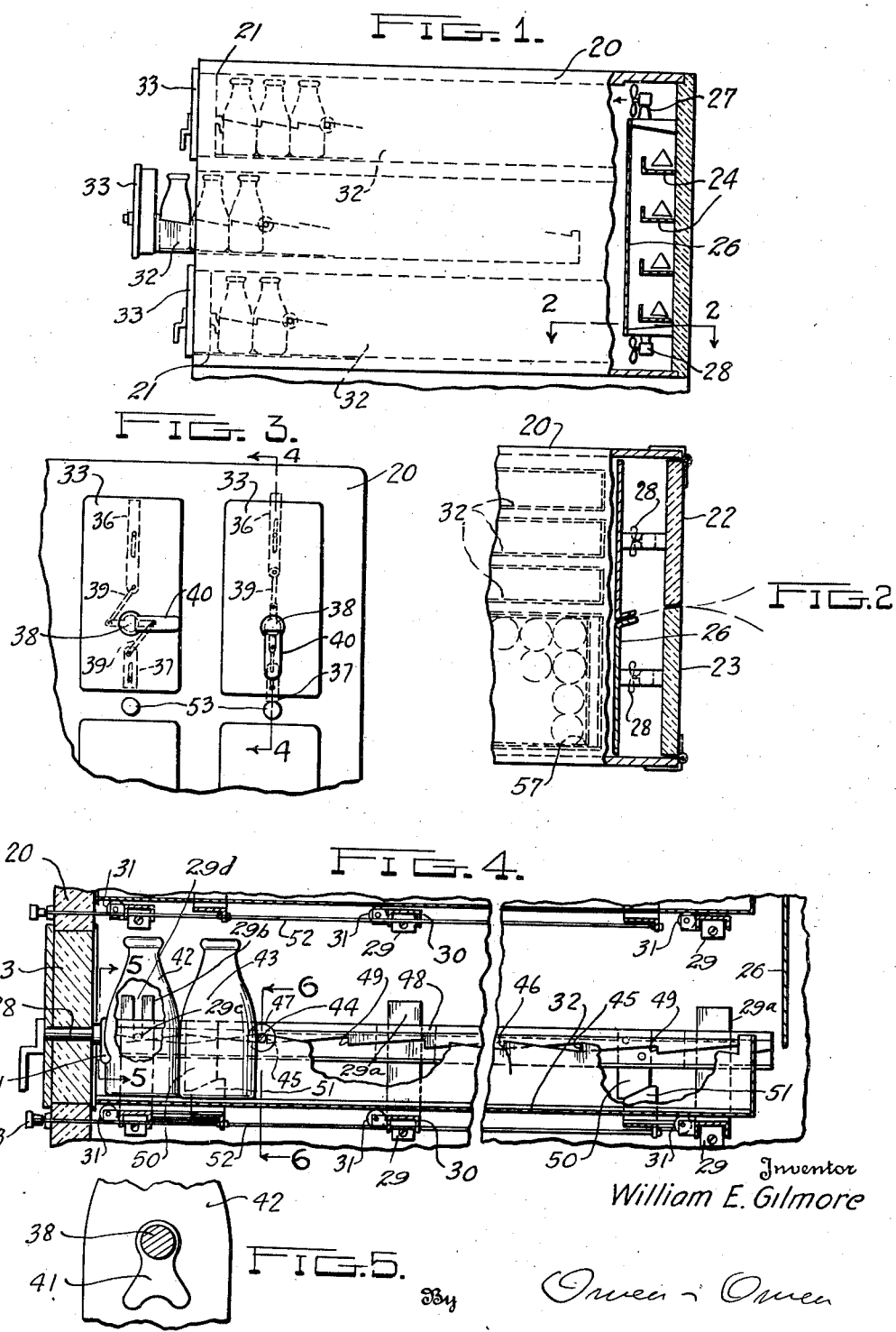
Inventor
William E. Gilmore
By Owen & Owen
Attorneys Nov. 22, 1938.  W. E. GILMORE  2,137,822
STORAGE AND DELIVERY APPARATUS
Filed Nov. 11, 1936   2 Sheets-Sheet 2
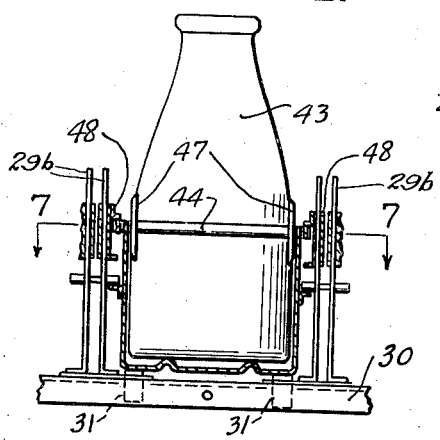
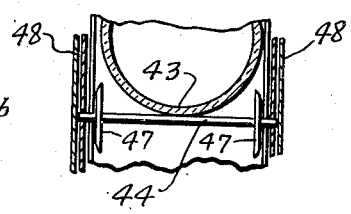
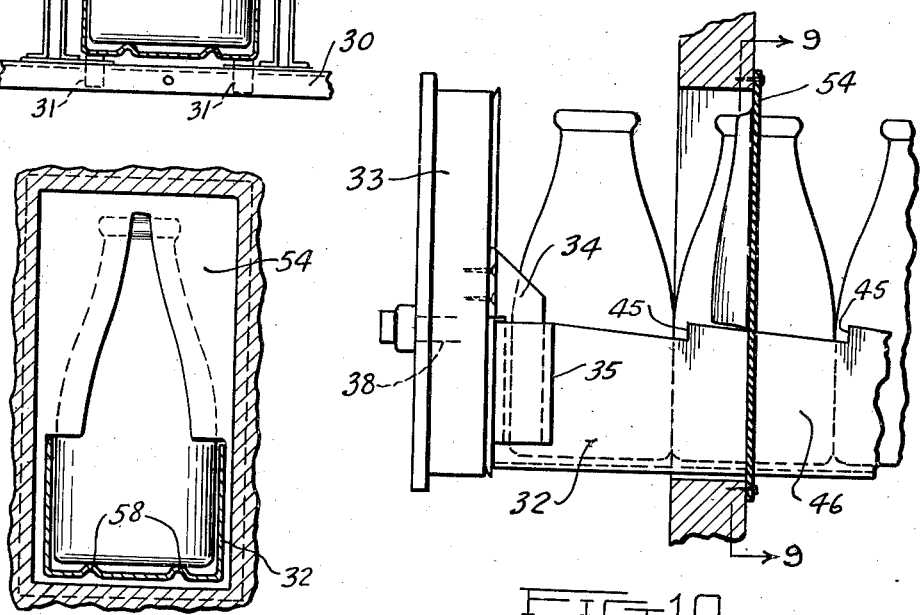
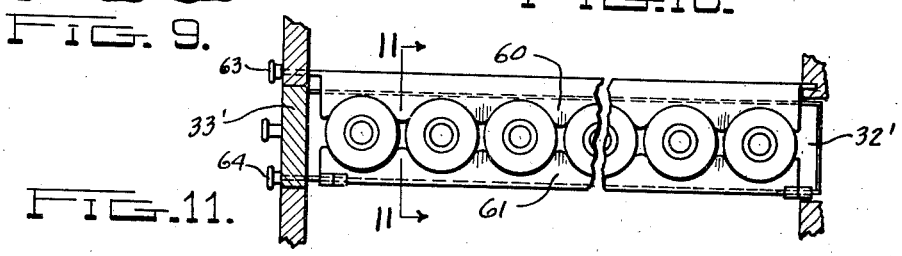
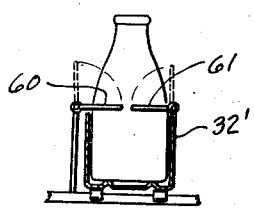
Inventor
William E. Gilmore
By Omen & Omen
Attorneys Patented Nov. 22, 1938

2,137,822

UNITED STATES PATENT OFFICE 2,137,822

STORAGE AND DELIVERY APPARATUS

William E. Gilmore, Detroit, Mich., assignor of one-third to Scott H. Lilly, Toledo, Ohio Application November 11, 1936, Serial No. 110,381

19 Claims. (Cl. 312—71)

This invention relates to storage and delivery apparatus and more particularly apparatus of this kind from which single articles may be conveniently removed without excessive exposure of the interior of the compartment in which the articles are stored.

The invention is particularly suitable for the storage and delivery of milk bottles and similar articles which are preferably maintained in a cool chamber before delivery.

The invention will be described in connection with a refrigerated compartment suitable for mounting upon a milk truck for the delivery of milk.

In the accompanying drawings forming a part of this specification,

Fig. 1 is a diagrammatic section of a compartment embodying one form of the invention;

Fig. 2 is a partial plan view on line 2—2 of Fig. 1;

Fig. 3 is a detail of the latch mechanism for the removable doors;

Fig. 4 is an enlarged longitudinal vertical section similar to one on line 4—4 of Fig. 3, but showing the bottles in the position which they occupy in the bottom drawer shown in Fig. 1;

Fig. 5 is a still further enlargement on the line 5—5 of Fig. 4;

Fig. 6 is an enlarged detail on the line 6—6 of Fig. 4;

Fig. 7 is a section on the line 7—7 of Fig. 6;

Fig. 8 is an enlarged detail of one end of the middle drawer as shown in Fig. 1;

Fig. 9 is a section on the line 9—9 of Fig. 8;

Fig. 10 is a partial plan view showing an alternative form of construction for controlling the position of the milk bottles;

Fig. 11 is a section on the line 11—11 of Fig. 10.

In the construction shown in the drawings, there is indicated a compartment 20 which is preferably provided with insulating walls. At the left side of the compartment, as viewed in Fig. 1, there are small door openings 21, while at the right side the entire end of the compartment may be opened up by pivoted doors 22 and 23. These pivoted doors are provided with shelves 24 on the inside, and any suitable refrigerant may be supported upon these shelves. The doors are also provided with means for supporting a baffle plate 26 which makes possible controlled circulation of air in the refrigerated compartment. An upper fan 27 and lower fan 28 are shown for creating a draft past the refrigerant when desired. In the construction shown, there are indicated three tiers of bottles. Of course, there may be as many as desired, but however many there may be, there is provided a supporting frame for each tier, the frames being alike and each comprises cross bars 30, mounting lugs 29, and spacing uprights or guides 29a and 29b. Each frame is provided with rollers 31 for receiving drawers 32. The left end of each drawer is provided with a removable door 33 which has a lug 34 thereon adapted to fit into a socket 35 on the end of the drawer, as shown in Fig. 8. In this way the door is removably mounted upon the end of the drawer.

The removable door may be held in position within opening 21 by suitable means. In the construction shown, the door is provided with upper and lower sliding bolts 36 and 37. To operate these bolts there is provided an oscillatable pivot 38 connected with the bolts by links 39 and operable by handle 40. On the inner end of latch pivot 38, there is a spring plate 41 which normally presses against bottle 42, as shown in Fig. 4. The lower end of the spring plate is curved to fit against the bottle, and resiliently resists turning of handle 40, so as to prevent accidental release of the door latch. This bottle next to the removable door is pressed by the spring plate 41 against the next bottle indicated at 43 in the arrangement shown in Fig. 4. In this paricular drawer, here are shown only the two bottles, and the second bottle 43 is pressed against a stop rod 44 resting in notches 45 in the drawer sides 46. Rod 44 is provided with flanges 47 which prevent movement of the rod across the drawer.

For aiding in controlling the position of stop rod 44, there is at each side of the drawer a floating ratchet bar 48 having teeth 49 opposed to notches 45 in the sides of the drawer. The ratchet bars are mounted for free vertical movement, but prevented from longitudinal movement. This may be effected by mounting the ratchet bars on guides 29a and 29b, and by pins 29c through the bars and working in slots 29d in guides 29b (see Figs. 4 and 6). In the construction shown, they are also provided with legs 50 resting upon cams 51. The cams 51 may be moved to raise or lower the ratchet bars by a rod 52 which projects through the side of the casing beneath the removable door and is provided with a knob 53 for convenient actuation.

The opening 21 around the door is provided on the inside with a gasket 54, as shown in Figs. 8 and 9. When the drawer is pulled out in position to make accessible the outer bottle, the second bottle moves into the opening in gasket 54, as shown in Figs. 8 and 9. The lower portion of the gasket, as shown in Fig. 9, contacts the sides of the drawer so that the opening past the drawer and bottles into the interior of the chamber is restricted as much as possible. All of the views except Fig. 2 are confined to a showing of the treatment and delivery of individual bottles, but a case such as indicated at 57 in Fig. 2 for holding a plurality of bottles, or any other desired articles, preferably of regular size and shape, could be handled in the same way.

The method of handling the apparatus described above may be varied according to circumstances, but a convenient operation may be described. The drawers 32 are completely removable from the chamber. Where the construction permits, they may be loaded and moved into the chamber through the openings 21, but in a common type of milk delivery truck the delivery space is not large enough to make this operation convenient. In such cases, and always when more convenient, the doors 22 and 23 may be opened and the loaded drawers moved into position from that side of the compartment. Then the doors 22 and 23 are closed and removable doors 33 are mounted upon the left ends of the drawers, as viewed in Fig. 1, and closed. Turning handle 40 presses spring plate 41 against the adjacent bottle and thereby prevents any play between the bottles, regardless of slight variations in the diameters of bottles or in their positions in the case. Even the variations resulting from embossed insignia on the bottles turned in various directions would result in objectionable play if there were not some provision made for preventing this.

When the operator desires to take out one or more bottles from a drawer, he releases the door 33 on the drawer from which he wishes to remove the bottle and pulls it out to the desired distance. He may pull it out so as to remove one bottle, as indicated in Figs. 1 and 8, or any greater number of bottles, if desired. In any case, the stop rod 44 is moved outward by the notched side of the drawer, the teeth of floating ratchet bars 48 being slanted in such a direction that they readily ride upward over the stop rod as it moves towards the delivery end of the compartment. However, the floating ratchet bars are free to drop as soon as the bar passes a tooth. The turning of the handle to release the delivery door also frees the line of bottles from locking spring 38 and thereby makes it easy to lift out as many bottles as are exposed outside the compartment. After the exposed bottles have been removed, the door and drawer are shoved back to the original closed position. During this movement, the stop bar 44 is prevented from movement by ratchet bars 48. The stop bar rides upward on the successive teeth of the drawer sides, but falls when each tooth passes it, and the ratchet bar rides up and down continuously with the stop bar. Since the stop bar thus prevents the rearward movement of the bottles in front thereof, beads 58 in the bottom of the drawer slide backward under the bottles, which remain contiguous to the discharge opening.

For example, suppose a drawer having only three bottles therein is drawn out from the closed position in which it is shown at the top of Fig. 1 to the delivery position in which it is shown in the middle of Fig. 1, the bottle outside of the compartment is then removed and the drawer is shoved back into closed position, as shown at the bottom of Fig. 1. In this position, it will be seen that the two remaining bottles have been prevented from rearward movement, and are locked in position at the front of the drawer by the closing of the door. It will be readily seen that in this way the bottles are constantly maintained at the front end of the drawer as long as there are any in the drawer, so that it is necessary to pull the drawer out only the width of one bottle to expose that bottle. If more than one bottle is to be exposed, the distance to which the drawer is pulled out may be governed accordingly, but in each instance the necessary movement of the drawer is limited to that of the width of the desired number of bottles, since there are no vacant spaces left at the front of the drawer after it has been closed until the drawer is entirely empty. If the operator should inadvertently pull the drawer out so as to expose more bottles than he desires to remove at one time, the floating ratchet bars may be raised by pulling out knob 53 so as to allow the closing of the drawer and the return of stop bar 44 the necessary distance. The ratchet bars may be raised also, if desired, for the original loading of the drawer into the compartment where it is convenient to do the loading from the delivery side.

It is preferable to build each supporting frame so that it carries the complete operating mechanism necessary for the drawers mounted thereon. This frame can be built and assembled and then mounted as a whole in the compartment. Where it is desirable to carry cases, as indicated in Fig. 2, in part or all of the drawers, a frame arranged for drawers of the necessary width can be included, and where desired one frame can be substituted for another without other change in the compartment after it has been built and assembled except for provision of proper openings 21. It will be readily understood that a plurality of cases may be mounted in a drawer in the same manner as described above in connection with the bottles, and moved out for delivery one at a time in the same way, the obvious changes in size and arrangement of the ratchets and stops being made to accomplish this result. It will also be understood that other articles and materials besides milk bottles may be carried and delivered in a similar way, suitable adjustment being made in the operating apparatus to accommodate the articles which are to be carried and delivered.

While two fans 27 and 28 have been diagrammatically indicated in the drawings, it will be understood that only one fan may be necessary, and that in some instances the natural circulation due to the cooling of the air in contact with the refrigerant will be sufficient, although for ideal results it is preferable to provide a fan and regulate its operation in accordance with the desired temperature in the compartment. In winter, heating means instead of a refrigerant may be provided.

It will be readily understood that widely different mechanical details may be provided for insuring that the articles remain in the front of the drawer until delivery, and also for locking the doors, locking the articles against play in the compartment, and accomplishing the other purposes of this invention.

In Figs. 10 and 11 there is somewhat diagrammatically illustrated one possible alternative form which accomplishes substantially the same results as the form disclosed in the other figures, although it requires more manipulation to accomplish the results. In this form of the device, there is shown a drawer 32' having a door 33' thereon similar to those discussed above. However, in place of the stop, ratchet bar, and locking means discussed above, there are provided notched members 60 and 61 which are pivoted on opposite sides of the row of bottles and, when in the position shown in Fig. 10, hold the bottles firmly in position. The notched members are preferably provided with yielding contact surfaces which may be rubber spring metal or other yielding construction, as desired.

One object is to firmly hold the bottles in position during transportation. Another object is to control the movement of the bottles. For this purpose, notched member 60 is pivoted upon the stationary frame, while notched member 61 is pivoted upon the side of the drawer. When one or more bottles are to be removed from an apparatus constructed in this manner, notched member 60 is oscillated by means of handle 63 to the position shown in dotted lines at the left of Fig. 11. Thereafter, the drawer with the bottles therein may be drawn out to the desired distance and the exposed bottles removed. After the exposed bottles have been removed, the notched member 60 may be returned to its locking position while notched member 61 is swung by handle 64 to the dotted line position shown at the right of Fig. 11. This locks the remaining bottles in the position to which they have been drawn adjacent the delivery side of the compartment, while it frees the drawer to be shoved back into closed position. Thereafter, notched member 61 is swung down to its original locking position so that the bottles are locked in place until time to remove another one from the drawer.

It will be seen that the mechanism of these two forms varies quite widely, but the results of their operation are substantially the same. While the forms shown are simple and effective, other mechanical means might be readily devised which would be the substantial equivalent of those shown for always maintaining the front or delivery end of the drawer filled as long as there are any articles for delivery remaining within the drawer. It will be noted that the bottles are locked against relative movement during transportation, but are freed from pressure while the drawer is opened and the articles are being removed therefrom.

Another important feature of the invention is the arrangement whereby the drawers may be loaded into the compartment from either end, whichever is more convenient. It is also advantageous to be able to open up completely one side of the compartment for loading purposes, and to open only one drawer at a time where access is desired to the contents of only one drawer. Furthermore, the arrangement whereby gaskets limit to a very small extent the communication of the interior of the compartment with the exterior during the opening and closing of the drawers is an advantageous feature. Moreover, it cooperates with the means for maintaining the articles in their forward position, as it will be readily understood that when a drawer is returned from the position in which it is shown in Fig. 8 to closed position, after removing the exposed bottle, the bottle contacting the gasket remains in contact with that gasket until the drawer is closed and so fills the opening in the side of the compartment.

Making the doors at the delivery side of the compartments removable from the drawers makes it possible to load the drawers from the other side of the compartment and place these doors on the drawers afterwards while avoiding the difficulties involved in hinging a plurality of doors on the delivery side of the compartment. Also, the drawer is pulled out to delivery position by opening the door, a result which could not be obtained unless the doors were mounted upon the drawers.

It will be readily seen that means have been provided whereby articles may be loaded into a compartment in a rapid and convenient manner, transported therein safely and in easily controlled temperature and without waste of refrigerant in the summer or heat in the winter, and at the same time may be readily and conveniently exposed and delivered in as small quantities as desired. While some possible variations have been suggested, it will be obvious that many other changes may be made in the details of construction and operation while retaining the main features of the invention as covered in the appended claims.

What I claim is:

1. In storage and delivery apparatus, a compartment having a discharge opening in one side thereof, a drawer, means within the compartment for supporting the drawer in line with the opening, a discharge door fitting into and around said opening, there being a loading opening in the side of the compartment opposite said discharge opening and through which said drawer may be inserted into the comparament, a door normally closing said loading opening, and means for releasably attaching the discharge door to the drawer.

2. Apparatus in accordance with claim 1, and comprising a plurality of drawers, each with its individual discharge door, and the loading opening being large enough to admit a plurality of the drawers simultaneously.

3. A storage and delivery receptacle for a delivery truck having a discharge opening in one side of the receptacle, means for supporting a drawer in the receptacle in line with the opening, a discharge door fitting into and around the opening, means to detachably mount the discharge door on the drawer, there being a loading opening on the opposite side of the receptacle from the discharge opening and through which the drawer can be inserted into the receptacle, and a door normally closing said loading opening.

4. Apparatus in accordance with claim 3 and comprising a plurality of drawers, each with its individual discharge door, and the loading opening being large enough to admit a plurality of the drawers simultaneously.

5. In a milk truck, a refrigerator compartment, a plurality of drawers in the compartment each adapted to contain a row of similar articles longitudinally of the drawer, a door in one side of the compartment removably mounted on each drawer, a door in the other side of the compartment, means in the compartment to slidably support the drawers in line with the doors in the opposite sides of the compartment, and stop means for preventing movement of articles with the drawer when it is pushed into the compartment from the side where the removable doors are mounted.

6. In storage and delivery apparatus, a compartment, a drawer slidably supported for movement into and out of the compartment, stop means for preventing movement of articles with the drawer when the drawer is pushed into the compartment, and means operable from outside of the compartment for rendering said stop means operable or inoperable at will.

7. In storage and delivery apparatus, a compartment having a discharge opening in one side thereof, a drawer adapted to support a row of articles, means in the compartment to slidably support the drawer in line with said opening, ratchet means allowing movement of the articles outward with the drawers and preventing their movement inward with the drawer, and means operable from outside the compartment to render the ratchet means operative or inoperative at will.

8. In storage and delivery apparatus, a compartment having a discharge opening in one side thereof, a drawer adapted to support a row of articles, means in the compartment to slidably support the drawer in line with said opening, ratchet means allowing movement of the articles outward with the drawer and preventing their movement inward with the drawer and releasable means at the front of the drawer for pressing the articles against the ratchet means.

9. In storage and delivery apparatus, a compartment having a discharge opening in one side thereof, a drawer adapted to support a row of articles, means in the compartment to slidably support the drawer in line with said opening, ratchet means allowing movement of the articles outward with the drawer and preventing their movement inward with the drawer, a door on the front of the drawer adapted to close the opening when the drawer is pushed fully into the compartment, a lock for the door, and means rendered operable by closing the lock for pressing articles backward in the drawer against the ratchet means.

10. In storage and delivery apparatus, a compartment having a discharge opening in one side thereof, a drawer adapted to support a row of articles, means in the compartment to slidably support the drawer in line with said opening, ratchet means allowing movement of the articles outward with the drawer and preventing their movement inward with the drawer, and a gasket around the opening and fitting against the drawer and an article therein when the drawer is withdrawn to the proper distance to expose one complete article outside of the compartment.

11. In storage and delivery apparatus, a compartment having an opening in one side, a drawer, means in the compartment to slidably support the drawer in line with said opening, the sides of the drawer having ratchet notches in their upper sides, a stop member across the drawer and resting on the drawer sides, ratchet bars normally resting on the upper side of said stop member, and means holding the bars against horizontal movement while permitting vertical movements, the ratchet teeth on both drawer and bars being shaped to prevent movement of the stop member towards the rear of the compartment.

12. In storage and delivery apparatus, a compartment having a charging opening in one side and a discharging opening in the other side, a drawer adapted to support a row of articles and movable through the openings, means in the compartment slidably supporting the drawer in line with the openings, ratchet means stopping articles in the drawer from sliding in the drawer towards the end of the drawer nearest the charging opening and from sliding with the drawer away from the discharging opening when the drawer is slid inwardly, and a door detachably mounted upon the drawer and fitting into and around the discharge opening and sealing the same.

13. In a storage and delivery apparatus, a compartment having a charging opening in one side and a discharging opening in the other side, a drawer adapted to support a row of articles and movable through said openings, means within the compartment slidably supporting the drawer in line with the openings, ratchet means stopping articles in the drawer from sliding in the drawer towards the end of the drawer nearest the charging opening and from sliding with the drawer away from the discharge opening when the drawer is slid inwardly and releasable means for pressing articles in the drawer against the ratchet means.

14. In storage and delivery apparatus, a compartment having a charging opening in one side and a discharging opening in the other side, a drawer adapted to support a row of articles and movable through said openings, means within the compartment slidably supporting the drawer in line with the openings, ratchet means stopping articles in the drawer from sliding in the drawer towards the end of the drawer nearest the charging opening and from sliding with the drawer away from the discharge opening when the drawer is slid inwardly, and means manually operable outside of the compartment for rendering the ratchet means inoperative.

15. Storage and delivery apparatus comprising a frame adapted to be mounted in a compartment, a drawer adapted to hold a row of articles with their tops projecting above the sides of the drawer, means on the frame for slidably supporting the drawer for movement into and out of the compartment, a stop rod normally resting on the sides of the drawer and extending transversely thereof, there being notches in the upper edges of the drawer sides with abrupt faces towards one end of the drawer, and ratchet bars mounted on the frame for vertical movement and normally resting on the rod and having notches with abrupt faces facing in the same direction as those of the notches in the drawer sides.

16. Apparatus in accordance with claim 15 and comprising a rod mounted upon the frame and extending out of the compartment in which the frame is mounted and having means engageable with the ratchet bars whereby movement of the rod raises the ratchet bars off of the stop rod.

17. In apparatus for delivering milk, an insulated compartment having charging doors in one side and discharging openings in the opposite side, drawers, each adapted to hold a row of upright milk bottles with their tops extending above the sides of the drawer, means within the compartment for slidably supporting a drawer in line with each discharge opening and in position to be moved in and out through said opening, a door for each discharge opening, and ratchet means to stop the bottles against movement with the drawer away from the discharge opening, said ratchet means comprising a rod transverse the drawer and resting on the sides thereof, and ratchet bars movable vertically in the compartment and resting on the rod, there being ratchet notches in the bars and in the sides of the drawer facing towards the discharge opening.

18. Storage and delivery apparatus comprising a compartment, a drawer slidable in and out through an opening in the side of the compartment and having a front closing the opening when the drawer is in its inner position, ratchet stop means stopping articles in the drawer from sliding away from the opening when the drawer is moved into the compartment, a lock for locking the drawer front in the opening, and means operable with the lock for pressing articles in the drawer against the stop.

19. Apparatus in accordance with claim 18 and adapted for holding and delivering bottles in upright position, and the last said means comprising a spring member having a concave face moved into engagement with the adjacent bottle by locking movement of the lock and yieldably holding the lock in locked position by that engagement.

WILLIAM E. GILMORE.